Figure 1:
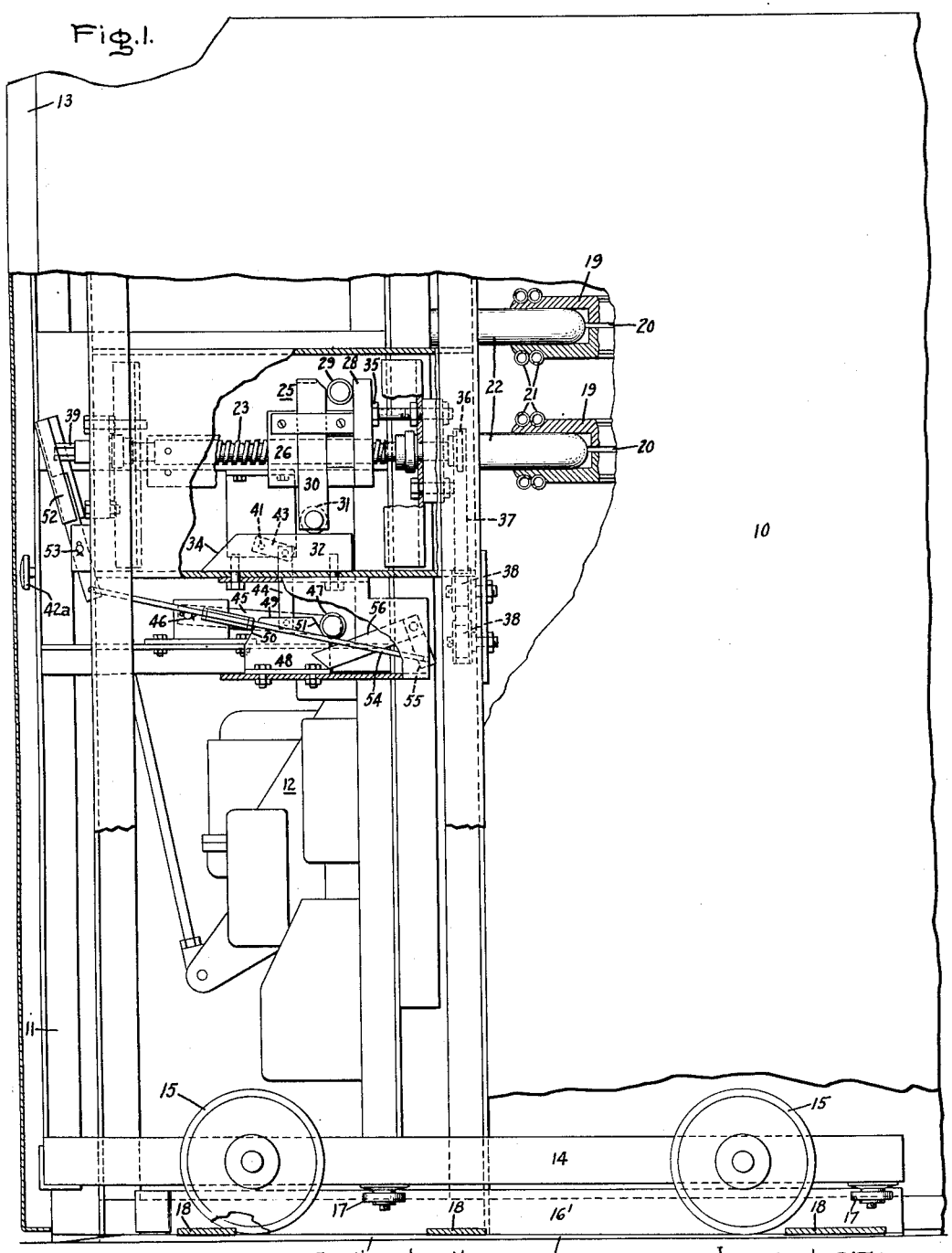

Inclined rail.

Inventor:
Bertram W. Mahoney,
by Harry E. Dunham
His Attorney,

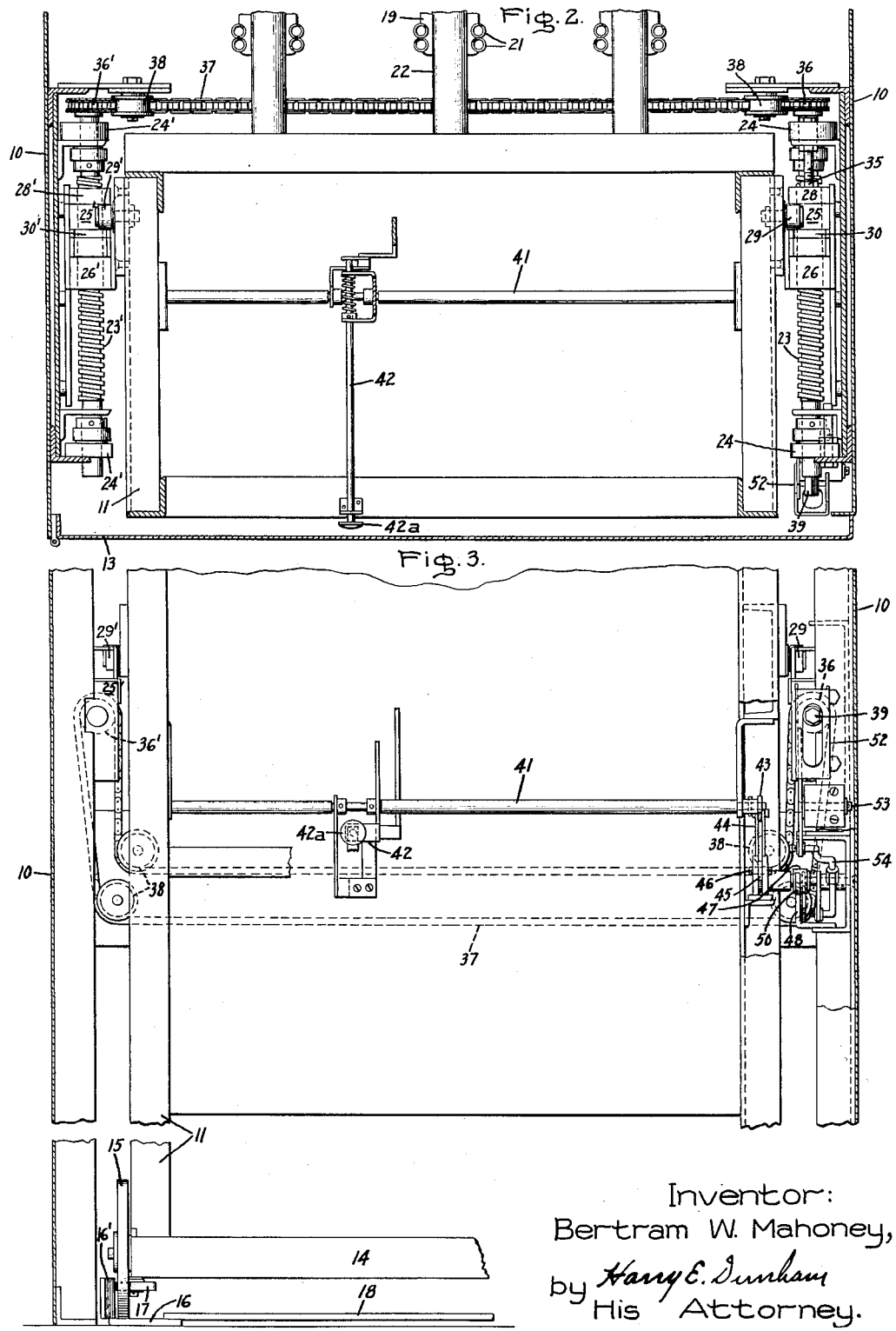

Feb. 10, 1942.   B. W. MAHONEY   2,273,002
ELECTRIC SWITCHGEAR
Filed March 1, 1940   3 Sheets-Sheet 3
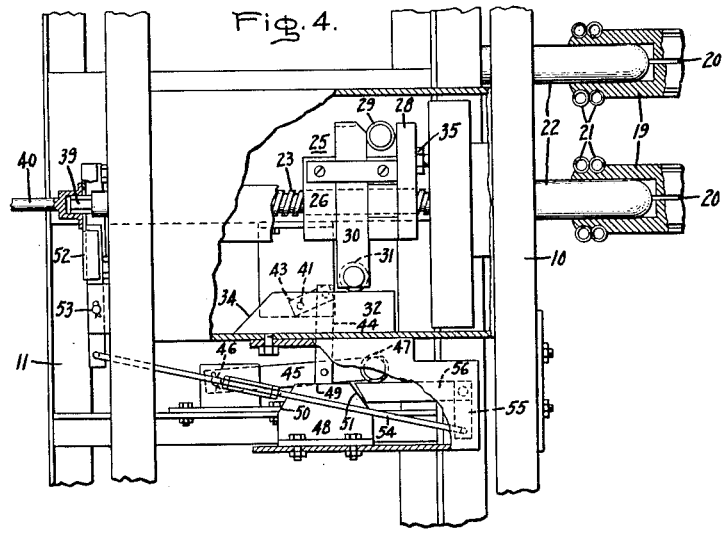
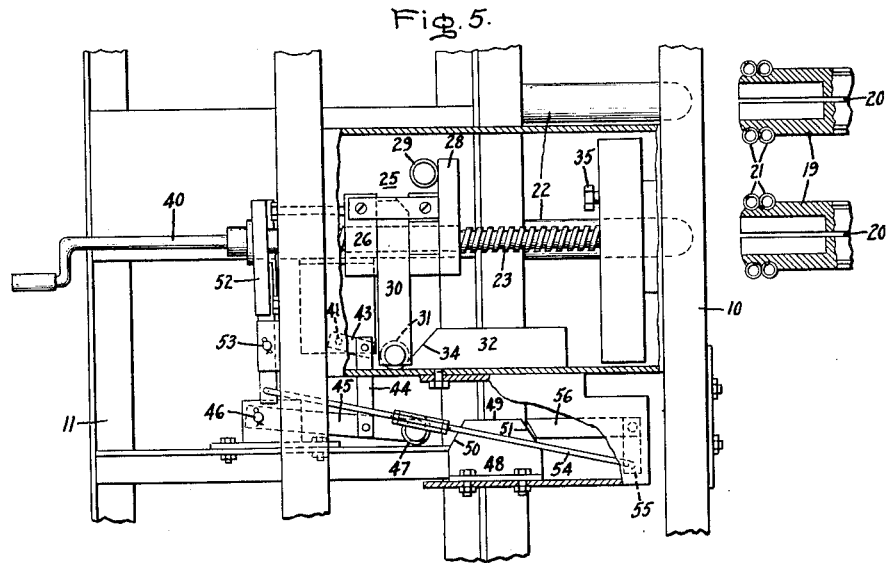
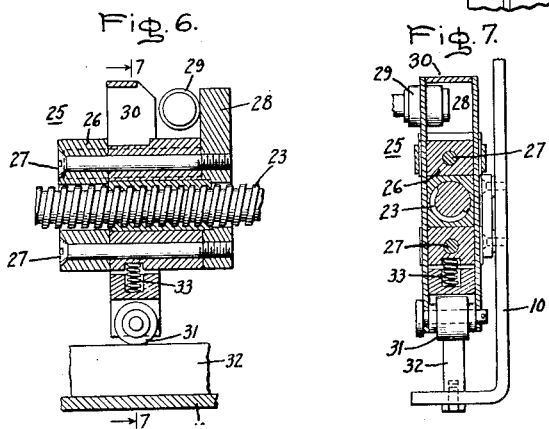
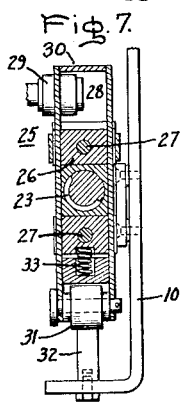
Inventor:
Bertram W. Mahoney,
by Harry E. Dunham
His Attorney.

Patented Feb. 10, 1942

2,273,002

UNITED STATES PATENT OFFICE 2,273,002

ELECTRIC SWITCHGEAR

Bertram W. Mahoney, Drexel Hill, Pa., assignor to General Electric Company, a corporation of New York Application March 1, 1940, Serial No. 321,673

10 Claims. (Cl. 175—298)

My invention relates to electric switchgear and more particularly to metal-enclosed switchgear of the draw-out type wherein a rack-out mechanism is provided for producing relative movement between a metal enclosure and a draw-out portion which includes a truck-mounted circuit breaker.

In metal-enclosed switchgear of the draw-out type, the conventional arrangement comprises a stationary metal housing within which bus bars, cable leads, and accessory apparatus are disposed and a removable unit comprising a circuit breaker which is suitably connected to the busses and incoming or outgoing leads in the operative position of the unit. In this position, so-called primary disconnecting contacts comprising contacts connected to the busses and incoming or outgoing leads and fixedly mounted with respect to the stationary housing and coacting movable contacts carried by the removable unit are in engagement. The apparatus is also provided with suitable interlocking means generally arranged so that it is impossible to withdraw or insert the removable unit or make or break connections at the primary disconnecting contacts without first tripping the circuit breaker, and insuring that the circuit breaker is open both when the unit is moved out of and into operative position.

In switchgear of this type, the removable unit usually comprises a truck-mounted circuit breaker which is adapted to be rolled on its wheels by the operator to an intermediate or test position relative to its associated stationary metal housing in which the low-tension circuits for operating the circuit breaker may be connected for test purposes. It is an object of my invention to provide improved means for holding the truck-mounted circuit breaker in this intermediate or test position in its movement both into and out of the stationary metal housing.

In the test position, the primary disconnecting contacts are sufficiently separated so that no high potential is impressed on the circuit breaker contacts. Means are usually provided for engaging the truck-mounted circuit breaker so that it may be forcibly moved the remaining distance into the metal housing, during which movement the primary disconnecting contacts are moved into frictional engagement. Since considerable force is required for this movement, especially in units of large ampere capacity, force-multiplying means are usually provided, which are used for moving the truck both into and out of the circuit-controlling position of the circuit breaker.

It is a further object of my invention, therefore, to provide a new and improved force-multiplying means for moving a truck type switchgear from the test to the circuit-controlling position or from the circuit-controlling to the test position.

It is another object of my invention to provide an improved metal-enclosed switchgear of the draw-out type which shall be simple and rugged in construction and efficient and safe in operation.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a side elevation partly in section of a metal-enclosed switchgear embodying my invention, Fig. 2 is a sectional plan view of the switchgear in the circuit-controlling position illustrated in Fig. 1, Fig. 3 is a front elevational view of a portion of the apparatus illustrated in Fig. 1, Fig. 4 is a sectional elevation showing the draw-out type of switchgear which has just been moved so that the primary contacts are completely engaged, Fig. 5 is a similar view showing the draw-out type of switchgear in the test or racked-out position, Fig. 6 is a detailed cross-sectional view of a portion of the force-multiplying mechanism, and Fig. 7 is a view taken on line 7—7 of Fig. 6.

Referring now to the drawings, I have illustrated a stationary housing 10 arranged in the form of a cubicle having sheet metal walls supported by a frame of angle members. This housing is open at the front to receive a removable unit 11 comprising a truck-mounted switch or circuit breaker including an operating mechanism therefor generally indicated at 12. The open front of the stationary housing 10 is closed by a suitable door 13.

The removable unit 11 of the switchgear includes a truck having a bottom supporting platform 14 carried by a plurality of truck wheels 15 which, in turn, are mounted on a pair of inclined rails 16. Inclined rails 16 are slightly higher at the front or open side of the metal housing 10 than at the rear, as may be seen from Fig. 1, for a purpose which will be described in greater detail hereinafter. The inclined rails 16 are provided with suitable guide flanges 16' which cooperate with guide rollers 17 so as to guide the removable unit 11 in its movement into and out of the metal-enclosing casing or housing 10. In order to maintain the pair of inclined rails 16 at a uniform distance from one another so that guide rollers 17 are effective, I provide suitable cross pieces 18 which may be welded or fastened in any suitable manner to each of the inclined rails 16.

For the purposes of clearness and simplicity in the drawings, the bus bars, cable leads, feeders, and accessory apparatus are omitted in the stationary housing and merely the stationary portion 19 of the primary disconnecting contacts are shown. These stationary contacts are mounted in housing 10 by suitable means, not shown, and comprise socket type contacts of well-known construction wherein a cylindrical member composed of copper or the like is slotted as at 20 and is surrounded by coiled or so-called garter springs 21 for insuring resilient engagement with the coacting plug contacts 22 associated with the removable unit 11 comprising the truck-mounted circuit breaker.

The rack-out mechanism or force-multiplying means for producing relative movement between housing 10 and removable unit 11 comprises a pair of jack screws 23 and 23' mounted horizontally one on either side of the housing 10. These jack screws 23 and 23' are mounted so as to be near the line of the primary disconnecting devices comprising members 19 and 22 which offer the greatest resistance to the relative movement of the stationary and movable parts of the truck type switchgear whereby the force is applied at the optimum point. Jack screws 23 and 23' are suitably mounted in bearings 24 and 24', respectively (Fig. 2), located at either end thereof which, in turn, are secured to the frame members of stationary housing 10 by any suitable means. In addition to the jack screws 23 and 23', the rack-out mechanism or force-multiplying means comprises a pair of traveling couplers 25 and 25', one of which is associated with each of the jack screws 23 and 23', respectively. Since these traveling couplers 25 and 25' are identical, only one of them will be described and the corresponding parts of the other traveling coupler 25' will be designated by primed reference numerals.

In Figs. 6 and 7, traveling coupler 25 is shown in detail as comprising a nut 26 cooperating with the threads on the jack screw 23 so as to be moved horizontally along the jack screw when the latter is rotated, the direction of movement depending upon the direction of rotation of the jack screw 23. Nut 26 has suitably fastened thereto by means of fastening means 27 a roller-engaging piece 28, which is adapted to engage a roller 29 fixedly attached to the removable unit 11 of the switchgear, as will be described in greater detail hereinafter. Traveling coupler 25 is also provided with a latching means comprising a vertically reciprocating engaging bolt 30 which is perpendicularly mounted relative to jack screw 23 and relatively movable with respect to nut 26 and roller-engaging piece 28. Engaging bolt 30 comprises a forked member surrounding nut 26 and slightly displaced from roller-engaging piece 28 so that, in the raised position, a U-shaped slot for roller 29 is formed. Engaging bolt 30 is provided with a roller 31 at the lower end thereof arranged to cooperate with a cam member 32 suitably mounted on the frame of metal-enclosing housing 10 for producing vertical movement of engaging bolt 30 when traveling coupler 25 moves along jack screw 23. A spring member 33 is provided for engaging bolt 30, which normally tends to bias bolt 30 downwardly relative to nut 26. Cam member 32 is provided with an inclined portion 34 which, when the removable unit 11 of the switchgear is moved into housing 10, causes engaging bolt 30 to be raised vertically to the position shown in Figs. 1, 4, 6, and 7, forming a notch or U-shaped slot in cooperation with nut 26 and roller-engaging piece 28 in which roller 29, fixedly attached to removable unit 11 of the switchgear, is engaged. Thus rotation of jack screw 23 and consequent movement of traveling coupler 25 will produce relative movement between removable unit 11 and housing 10 by virtue of roller 29 cooperating with roller-engaging piece 28 and reciprocating bolt 30. When reciprocating bolts 30 and 30' have slid off the respective inclined surfaces 34 and 34', the removable unit 11 may be freely withdrawn from housing 10. A suitable stop 35 is provided for engaging with traveling coupler 25 and limiting its movement and, consequently, also the movement of removable unit 11 into housing 10. It will be understood by those skilled in the art that, if greater force is necessary for engaging and disengaging the primary contacts, this can readily be obtained by the inclusion of a simple multigear ratio for rotating jack screw 23.

In order to prevent binding of removable unit 11 while being moved in housing 10, I provide means for simultaneously moving traveling couplers 25 and 25' and simultaneously rotating jack screws 23 and 23'. Accordingly, the ends of jack screws 23 and 23' adjacent the rear bearings 24 and 24' are provided with sprocket wheels 36 and 36', respectively, which are interconnected by means of a sprocket chain 37 which is guided over suitable guide pulleys 38. This sprocket chain 37 is arranged so as not to interfere with the movement of the removable unit 11 into and out of housing 10. The front end of jack screw 23 extending beyond the front frame of the housing 10 is provided with a hexagonal portion 39 for cooperation with manual operating means, such as a socket crank 40, for example, shown in Figs. 4 and 5. The hexagonal portion 39 of jack screw 23 may obviously be motor operated, if desired.

Interlocking of the circuit breaker with respect to the frame and the rack-out mechanism is accomplished in the present instance by relating the circuit breaker tripping means to cam means carried by the frame of the stationary metal-enclosing housing and to means for blocking the operation of the hexagonal end 39 of jack screw 23. The tripping mechanism for the circuit breaker, not shown, is arranged to be operated by several different means which rotate a tripping shaft 41, best shown in Figs. 2 and 3, in the counterclockwise direction. A manually operable means 42 for rotating tripping shaft 41 is provided, whereby the operator may trip the circuit breaker merely by moving handle 42a. Tripping shaft 41 is interlocked with the rack-out mechanism by a mechanical linkage comprising pivotally related levers 43, 44, and 45 suitably supported by fixed pivot 46. The end of lever 45 is provided with a roller 47 adapted to engage with a cam member 48 suitably mounted to the frame of stationary housing 10. Cam 48 is provided with a top flat surface 49 and front and rear inclined surfaces 50 and 51, respectively. When the removable unit 11 of the switchgear has been moved into the metal-enclosing housing 10 so that roller 47 engages the inclined surface 50 of cam 48, the circuit breaker, not shown, is tripped by the counterclockwise rotation of tripping shaft 41 due to the upward movement of lever 45, which occurs when roller 47 rides up the inclined surface 50. When the circuit breaker is moved to the position so that roller 47 is about to engage inclined surface 50 of cam 48, somewhat like the position shown in Fig. 5, the circuit breaker is in the test position and the primary contacts, comprising members 19 and 22, are disconnected. Further movement of the removable unit 11 is obtained by rotating jack screws 23 and 23' through crank 40 so that traveling couplers 25 and 25' engaging rollers 29 and 29', respectively, force unit 11 to move inwardly into housing 10. Lever 45 and associated roller 47 engaging with cam 48 insure that the circuit breaker is tripped and the flat surface 49 of cam 48 insures that it remains tripped while moving from the test to the circuit-controlling position, the latter being indicated by Figs. 1 and 4 when the primary contacts comprising members 19 and 22 are engaged. The top flat surface 49 of cam 48 is of sufficient length to provide a safe break distance between primary contact members 19 and 22 when the removable unit 11 is in the test, intermediate, or racked-out position and yet not to allow roller 47 to drop down inclined surface 51 until the circuit breaker is in the circuit-controlling position when tripping shaft 41 can rotate in a clockwise direction with reference to Figs. 1, 4, and 5 so that the circuit breaker may be closed. Accordingly, the circuit breaker is "locked out" or held in the tripped position while being moved by the force-multiplying means, comprising traveling couplers 25 and 25' and associated apparatus, from the test to the circuit-controlling position.

In order that jack screws 23 and 23' may not be rotated to withdraw removable unit 11 from metal-enclosing housing 10 when the associated circuit breaker is closed, a blocking mechanism for the hexagonal end 39 of jack screw 23 is provided, which comprises a member 52 pivotally mounted at 53 on the front frame of housing 10. This member 52 is connected by suitable levers 54 and 55 to a pivotally mounted cam member 56 adapted to engage with roller 47 when the circuit breaker is in the circuit-controlling position of Fig. 1 so as to raise roller 47 and associated lever 45 as shown in Fig. 4, whereby trip shaft 41 is rotated in a counterclockwise direction and the circuit breaker, not shown, is tripped. This is accomplished by moving member 52 into the position shown in Figs. 4 and 5 so that socket crank 40 can engage the hexagonal end 39 of jack screw 23. By this arrangement, it is impossible to use socket crank 40 to withdraw removable unit 11 from the circuit-controlling position without tripping the circuit breaker, not shown, through tripping shaft 41.

The traveling couplers 25 and 25' cooperating with rollers 29 and 29' insure that the circuit breaker is held in the circuit-controlling position. In order to insure that the circuit breaker remains in the test or intermediate position when placed there by the operator, the rails 16, as was mentioned before, are inclined in such a manner that gravity serves to hold the removable unit 11 in the test position wherein rollers 29 and 29' engage with the roller-engaging pieces 28 and 28' of traveling couplers 25 and 25', respectively. Thus, by merely inclining the rails, no other means are necessary to assure the operator that the circuit breaker will remain in the test position.

For simplicity of disclosure and description, the secondary or control connections for electrically operating the circuit breaker in the circuit-controlling and test positions are not shown.

The operation of the switchgear embodying my invention will be described first with reference to Fig. 5 where the removable unit 11 has just been rolled into the metal-enclosing housing 10 by the operator so as to be substantially in the test or racked-out position with rollers 29 and 29' engaging members 28 and 28' of traveling couplers 25 and 25', respectively. In view of the inclined rails 16, removable unit 11 is held in this test position by gravity and no other securing means are necessary. Primary disconnecting contacts comprising members 19 and 22 are still disengaged in this position but the secondary connections, not shown, for operating the circuit breaker may be made at this time so the operation of the circuit breaker may be tested. Since roller 47 of the tripping interlock mechanism has not engaged with the inclined surface 50 of cam 48, the circuit breaker, not shown, may be moved to the closed position. If, now, the operator should desire to move the truck-mounted circuit breaker into the circuit-controlling position shown in Figs. 1 and 4, crank 40 is applied to the hexagonal end 39 of jack screw 23. In order that crank 40 may be engaged with the hexagonal end 39 of jack screw 23, pivotally mounted interlock member 52 must be moved in a clockwise direction, causing cam member 56 to move upwardly. This, however, has no effect when the truck-mounted circuit breaker is in the test or racked-out position. Rotation of crank 40 will cause traveling couplers 25 and 25' to move along jack screws 23 and 23', respectively, and, when rollers 31 and 31' at the lower ends of engaging bolts 30 and 30' contact with the inclined surfaces 34 and 34' of cams 32 and 32', engaging bolts 30 and 30' are raised to the positions shown in Figs. 1, 4, 6, and 7. Further movement of traveling couplers 25 and 25' along jack screws 23 and 23' causes engaging bolts 30 and 30' to move rollers 29 and 29' and, hence, also the truck-mounted circuit breaker 11 into the metal-enclosing housing 10. At the same time, roller 47 engages cam 48 so as to rotate the trip shaft 41 to insure that the circuit breaker is in the open position prior to the engagement of members 19 and 22 comprising the primary contacts. Crank 40 is rotated until the primary contacts comprising members 19 and 22 are completely engaged, whereupon traveling coupler 25 strikes stop 35 and roller 47 associated with the tripping mechanism of the circuit breaker has moved beyond cam 48, as shown in Fig. 4. As soon as crank 40 is removed from the hexagonal end 39 of jack screw 23, pivotally mounted member 52 rotates in a counterclockwise direction, allowing pivoted cam member 56 to release roller 47 to the position shown in Fig. 1 whereupon the tripping shaft of the circuit breaker is moved to the inoperative position and closure of the circuit breaker may occur.

If it is desired to remove the truck-mounted circuit breaker 11 from the metal-enclosing housing 10, member 52 is again pivoted in a clockwise direction when crank 40 is applied to hexagonal end 39 of jack screw 23, whereupon cam member 56 raises roller 47 to trip the circuit breaker in the event that it is in the closed position. Thereafter, rotation of jack screws 23 and 23' causes traveling couplers 25 and 25' to move from the rear to the front of the enclosing casing 10 and roller-engaging pieces 28 and 28' force rollers 29 and 29' and, consequently, truck-mounted circuit breaker 11 out of the metal-enclosing casing 10, whereupon the primary disconnecting contacts comprising members 19 and 22 are disengaged. The circuit breaker is maintained in an inoperative position during this movement by virtue of the flat surface 49 of cam 48 cooperating with roller 47 associated with the tripping mechanism. As soon as reciprocating bolts 30 and 30' are allowed to move downwardly upon reaching inclined surfaces 34 and 34', respectively, the removable unit 11 is free to be withdrawn completely from housing 10.

By the above arrangement, I have provided a simple, rugged, and compact arrangement of a rack-out mechanism for a truck type switchgear and uniform movement of the movable portion of the switchgear is insured by the two traveling couplers and associated jack screws which are driven simultaneously by virtue of sprocket chain 37. Furthermore, this rack-out mechanism can be used with removable units of varied ratings so that only one type rack-out mechanism is necessary.

The metal-enclosed switchgear described above is readily installed since the entire apparatus may be factory built and similar equipments may be arranged in a row to form a switchboard of uniform and neat appearance. By reason of complete enclosure of each individual unit, there is less fire hazard from sources both within and external to the switchgear. Furthermore, safety to attendants is assured by the fact that all primary live apparatus is completely enclosed at all times. Repairs or replacements of the switch unit can be made only after the movable unit is withdrawn and disconnected from the live parts of the circuit. During the usual time required for maintenance and inspection of the removable unit, a faulty or damaged unit can be quickly withdrawn and replaced by a spare unit. The quick and ready replacement of faulty units is obviously an important consideration in continuity of service.

While I have shown and described a particular embodiment of my invention, I do not desire my invention to be limited to the construction shown and described for it will, of course, be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. Electrical switchgear of the draw-out type comprising a stationary housing having electrical circuits therein, a truck movable into and out of said housing, inclined rails mounted within said housing upon which said truck is movable, an electrical switch unit and operating mechanism therefor carried by said truck, primary disconnecting devices having cooperating members carried by said switch unit and said housing, said rails being inclined toward the back of said housing whereby said switch unit is held in a test position by the action of gravity.

2. Electrical switchgear of the draw-out type comprising a stationary housing having electrical circuits therein, a truck movable into and out of said housing, inclined rails mounted within said housing upon which said truck is movable, an elecrical switch unit and operating mechanism therefor carried by said truck, said truck-mounted circuit breaker being so constructed and arranged as to assume either a test position or a circuit-controlling position in said housing, and a rack-out mechanism both for moving said truck-mounted circuit breaker from said test position to said circuit-controlling position and holding said truck-mounted circuit breaker in said last-mentioned position, said truck-mounted circuit breaker cooperating with said inclined rails being held in said test position by the action of gravity.

3. In an electric switchgear, the combination of a stationary housing, a truck-mounted circuit breaker arranged to be moved horizontally into and out of a circuit-controlling position in said housing, primary disconnecting devices having cooperating members carried by said truck and said housing, a pair of horizontally mounted jack screws positioned one on either side of said housing and arranged so as to be near the line of relative movement of said disconnecting devices, a traveling coupler mounted on each of said jack screws so as to be moved horizontally therealong upon rotation of said jack screws, a pair of rollers associated with said truck-mounted circuit breaker and arranged to be engaged by said traveling couplers whereby relative movement between said truck-mounted circuit breaker and said housing for making or breaking said primary disconnecting contacts is obtained upon rotation of said jack screws, and means for obtaining simultaneous movement of said traveling couplers comprising a sprocket associated with each jack screw and a sprocket chain interconnecting said sprockets so as to obtain simultaneous rotation of said jack screws.

4. In an electric switchgear, the combination comprising a stationary housing, a truck-mounted circuit breaker arranged to be moved horizontally into and out of said housing and held in a plurality of positions in said housing, primary disconnecting devices having cooperating members carried by said truck-mounted circuit breaker and said housing which are engaged in one of said plurality of positions of said truck-mounted circuit breaker and disengaged in another of said plurality of positions of said truck-mounted circuit breaker, means including a jack screw and associated traveling coupler for moving said truck-mounted circuit breaker from one of said positions to said other for engaging or disengaging said primary disconnecting devices, means for holding said circuit breaker in one of said positions, and means including said jack screw and traveling coupler for holding said truck-mounted circuit breaker in another of said plurality of positions.

5. Electrical switchgear of the draw-out type comprising a stationary housing, a truck-mounted circuit breaker arranged to be moved horizontally into and out of a circuit-controlling position in said housing, primary disconnecting devices having cooperating members carried by said truck-mounted circuit breaker and said housing, means including a plurality of traveling couplers and associated horizontally mounted jack screws for producing relative movement between said truck-mounted circuit breaker and said stationary housing to effect engagement and disengagement of said primary disconnecting devices, said traveling couplers comprising latching means operable in response to rotation of said jack screws for engaging cooperating members on said truck-mounted circuit breaker, means for operating said jack screws, and means for preventing the operation of said last-mentioned means when said truck-mounted circuit breaker is in the closed position.

6. Electrical switchgear of the draw-out type comprising a stationary housing, a truck-mounted circuit breaker arranged to be moved horizontally into and out of a circuit-controlling position in said housing, means for producing relative movement between said truck-mounted circuit breaker and said housing comprising a pair of horizontally mounted jack screws positioned one on either side of said housing, a traveling coupler associated with each of said jack screws and arranged to move along said jack screws between the front and the back of said housing, said traveling couplers comprising a vertically movable engaging bolt, cam means associated with said housing and cooperating with said bolt to produce vertical movement thereof upon rotation of said jack screws and consequent movement of said traveling couplers along said jack screws, and means associated with said truck-mounted circuit breaker and arranged to be engaged by said engaging bolt whereby said truck-mounted circuit breaker is moved into or out of said housing upon rotation of said jack screws.

7. Electrical switchgear of the draw-out type comprising a stationary housing, a truck-mounted circuit breaker arranged to be moved horizontally into and out of a circuit-controlling position in said housing, primary disconnecting devices having cooperating members carried by said truck-mounted circuit breaker and said housing, means including a plurality of traveling couplers and associated horizontally mounted jack screws for producing relative movement between said truck-mounted circuit breaker and said stationary housing to effect engagement and disengagement of said primary disconnecting devices, said traveling couplers each comprising latching means operable in response to rotation of said jack screws for engaging cooperating members on said truck-mounted circuit breaker, means for operating said jack screws to produce said relative movement, and means for insuring the tripped condition of said circuit breaker while said primary disconnecting devices are being engaged and disengaged.

8. In an electric switchgear, the combination of a stationary housing, a truck-mounted circuit breaker arranged to be moved horizontally into and out of said housing and held in either a test or a circuit-controlling position in said housing, primary disconnecting devices having cooperating members carried by said truck-mounted circuit breaker and said housing which are engaged in said circuit-controlling position and disengaged in said test position of said truck-mounted circuit breaker, means including a pair of horizontally mounted jack screws and associated traveling couplers for moving said truck-mounted circuit breaker between said test and circuit-controlling positions for engaging or disengaging said primary disconnecting devices, means including said jack screws and traveling couplers for holding said truck-mounted circuit breaker in said circuit-controlling position, and a pair of inclined rails upon which said truck-mounted circuit breaker is arranged to be moved whereby the action of gravity holds said truck-mounted circuit breaker in said test position.

9. In an electric switchgear, the combination comprising a stationary housing, a separate movable structure including a circuit breaker mounted thereon arranged to be moved into and out of circuit-controlling position in said housing, primary disconnecting devices having cooperating members carried by said housing and said movable structure, means for effecting engagement and disengagement of said primary disconnecting devices comprising a traveling coupler member movably mounted on a jack screw for engaging a cooperating member, one of said members being associated with said stationary housing while the other of said members is associated with said movable structure, said traveling coupler member comprising a latching means operable in response to rotation of said jack screw for causing engagement of said cooperating member.

10. In an electric switchgear, the combination comprising a stationary housing, a separate movable structure including a circuit breaker mounted thereon arranged to be moved into and out of circuit-controlling position in said housing, primary disconnecting devices having cooperating members carried by said housing and said movable structure, means for effecting engagement and disengagement of said primary disconnecting devices comprising a traveling coupler member movably mounted on a jack screw for engaging a cooperating member, one of said members being associated with said stationary housing while the other of said members is associated with said movable structure, said traveling coupler member comprising a movable engaging bolt, and cam means supported by the same structure as said cooperating member to cause movement of said bolt and engagement of said cooperating member upon operation of said jack screw.

BERTRAM W. MAHONEY.